United States Patent [19]
Walker

[11] 4,036,067
[45] July 19, 1977

[54] INTEGRAL REVOLUTION CLUTCH

[75] Inventor: Alexander D. R. Walker, Mt. View, Calif.

[73] Assignee: N-Dimensions, Inc., Cupertino, Calif.

[21] Appl. No.: 611,125

[22] Filed: Sept. 8, 1975

[51] Int. Cl.² .............................................. F16H 27/00
[52] U.S. Cl. ...................................... 74/112; 74/63; 74/125.5
[58] Field of Search ............... 74/213, 214, 25, 63, 74/89.12, 89.2, 112, 125.5

[56] References Cited
U.S. PATENT DOCUMENTS

| 694,211 | 2/1902 | Souhami | 74/214 |
| 2,679,761 | 6/1954 | Pedersen | 74/213 |

Primary Examiner—Samuel Scott
Assistant Examiner—Wesley S. Ratliff, Jr.
Attorney, Agent, or Firm—Robert G. Slick

[57] ABSTRACT

An integral revolution clutch is provided wherein a motor rotates a drive pulley which continuously drives an idler pulley through a belt. A drive shaft is provided with a segment of a circle thereon connectable to the idler pulley by means of the belt. A spring means urges the segment into contact with the belt and a stop means normally prevents contact. When the stop means is deactivated, the segment is drawn between the belt and the pulley, causing the shaft on which the segment is located to make an integral number of revolutions until the stop means is restored. In a similar manner, power can be taken directly from the drive pulley.

6 Claims, 11 Drawing Figures

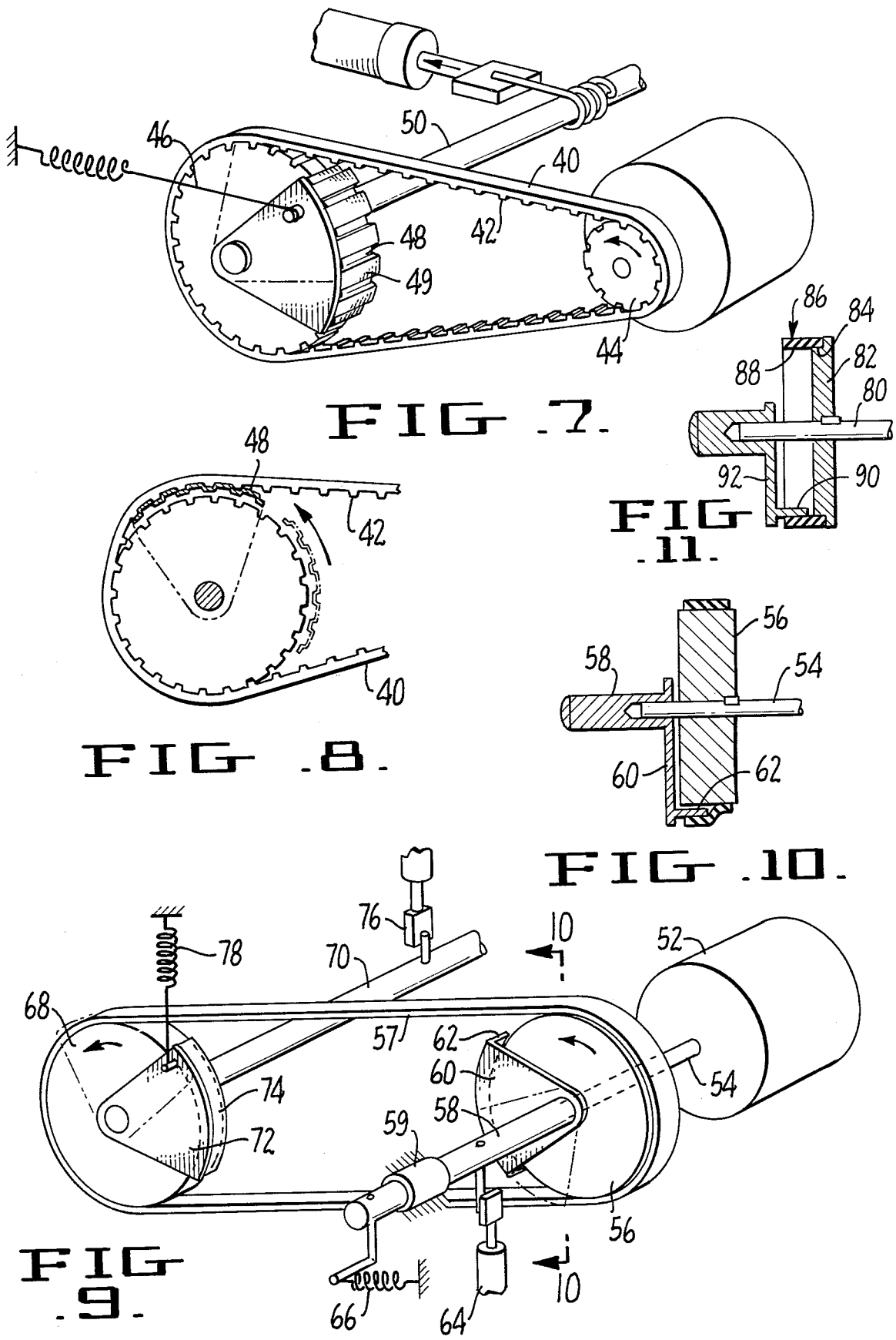

४,०३६,०६७

INTEGRAL REVOLUTION CLUTCH

SUMMARY OF THE INVENTION

In many applications, it is desirable to provide a drive mechanism wherein a driven shaft will make a single revolution or an integral number of revolutions upon the receipt of some command such as an electrical pulse. In the past, indexing motors have ordinarily been used for this purpose, but such motors are heavy, expensive and draw a large amount of current.

In accordance with the present invention, an integral revolution clutch mechanism is provided wherein an inexpensive motor is employed which runs continuously at a fixed speed. A much smaller motor is required than would be the case if the motor had to supply its own starting torque each time the shaft is indexed.

Accordingly, it is an object of the present invention to provide an integral revolution clutch which is simple and foolproof in operation.

Another object of the invention is to provide an integral revolution drive device wherein the energy available to the driven shaft is much greater than the instantaneous capability of the motor.

Another object of the invention is to provide a simple, positive indexing mechanism.

A further object is to provide two independent take-off operations from a single motor.

Other objects and features of the invention will be brought out in the balance of the specification.

BRIEF DESCRIPTION OF THE DRAWINGS

FIG. 7 is a perspective view, similar to FIG. 1, showing an embodiment of the invention employing a toothed belt and pulleys.

FIG. 8 is a partial side view of the structure shown in FIG. 7, showing the engagement of the toothed segment.

FIG. 9 is a perspective view of an embodiment of the invention wherein two separate and independent intermittent drives can be obtained from the same motor.

FIG. 10 is a section on the line 10—10 of FIG. 9.

FIG. 11 is a section, similar to FIG. 10 but showing another embodiment of the pulley and segment.

DESCRIPTION OF THE PREFERRED EMBODIMENTS

Figure 1:
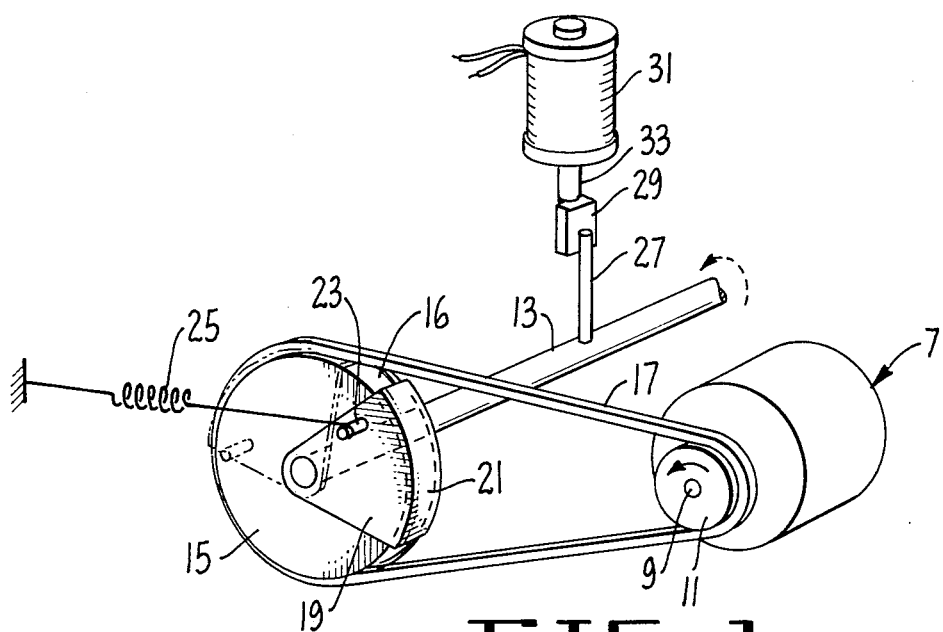
FIG. 1 is a perspective view of a drive mechanism embodying the present invention.
Figure 2:
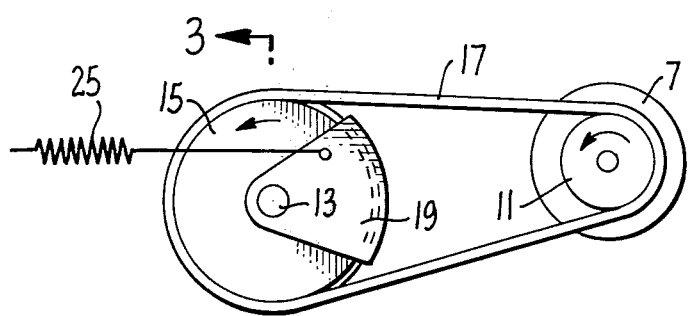
FIG. 2 is a side view of the drive mechanism showing the position of the parts during a standby period.
Figure 3:
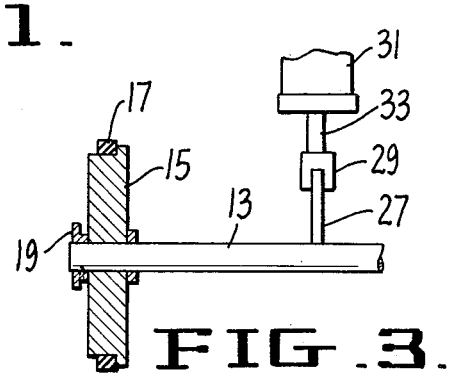
FIG. 3 is a section on the line 3—3 of FIG. 2.

Referring now to the drawings by reference characters, and particularly FIGS. 1-5, there is shown a motor 7 having a drive shaft 9 with a pulley 11 thereon. Mounted parallel to the drive shaft 9 is a driven shaft 13. The driven shaft 13 has a pulley 15 thereon which rotates freely with respect to shaft 13 and which is driven by belt 17 from the pulley 11 acting on the driving face 16 of pulley 15. An arm 19 directly connected to the shaft 13 so that if the arm 19 moves, the shaft 13 moves with it. Arm 19 has a segment member 21 attached thereto, said segment member closely overlying a small portion of the driving face 16 of pulley 15 and being normally spaced slightly therefrom so that the member 21 is normally not in contact with the face 16 of pulley 15. Since the belt 17 is normally in contact with about 180° of the pulley face 16 (i.e., slightly more or less than 180° depending upon the relative sizes of pulleys 11 and 15), the segment 21 will have an arcuate length of somewhat less than 180° and may be very substantially less. In any event, as will be later apparent, the segment must normally lie between the tangent portions of belt 17 without touching the belt.

Arm 19 has a pin 23 extending therefrom which is connected to a spring 25 which biases arm 19 in the direction of rotation of pulley 15. Shaft 13 carries a pin 27 which is normally in contact with a stop 29. Thus, spring 25 urges shaft 13 in the direction of rotation of pulley 15, but the stop 29 normally prevents the shaft from rotating. Stop 29 is provided with a means for withdrawing it from contact with the pin 27 which can conveniently take the form of a solenoid 31, having an armature 33 attached to stop 29. Pin 27 can be eliminated and the stop made to act on pin 23.

In some instances, the spring can be eliminated since friction or gravity, if the rotation direction is reversed, will serve as the bias means. The use of a spring is preferred to bring the segment rapidly up to speed as well as insuring positive action and preventing rebound.

Figure 4:
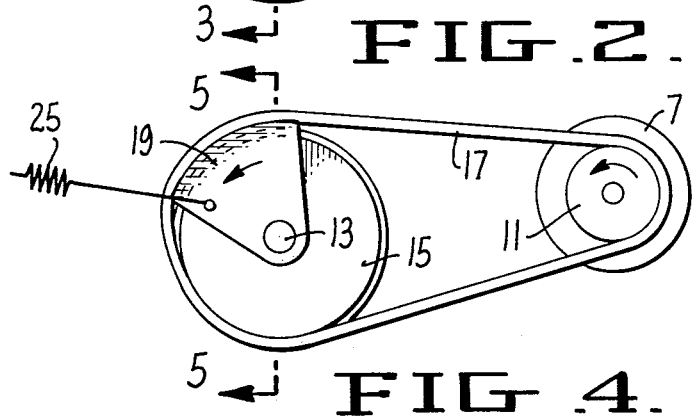
FIG. 4 is a view, similar to FIG. 2, showing the position of the parts during a portion of the time when the driven shaft is revolving.
Figure 5:
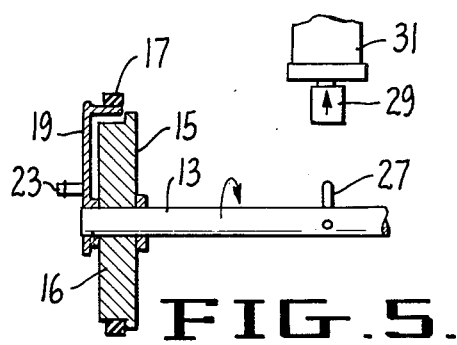
FIG. 5 is a section on the line 5—5 of FIG. 4.

The operation of the device can now be readily appreciated by reference to FIGS. 2 through 5. In the normal conditon, the parts are in the position shown in FIGS. 2 and 3 wherein the pulley 11 is continously driving the pulley 15 through the belt 17. Stop 29, acting on the pin 27, prevents any rotation of shaft 13. Now if one energizes solenoid 31, stop 29 is removed from contact with pin 27 so that spring 25 urges segment 21 into contact with belt 17 as is shown in FIGS. 4 and 5. The motor acting through the belt against segment 21 now rotates shaft 13. If solenoid 31 is pulsed only momentarily, as shaft 13 makes one revolution, stop 29 again engages pin 27 so that shaft 13 is again at rest and the parts are in a position for a repetition of the operation. If the stop is released for a longer period of time, more than one revolution of shaft 13 is obtained.

Figure 6:
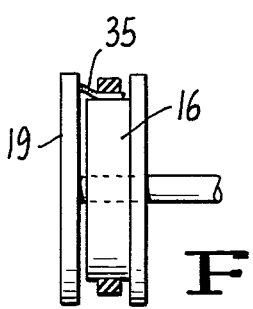
FIG. 6 is a view, similar to FIG. 5, showing an embodiment of the invention having a flexible driven segment.

In the structure thus far described, segment 21 is a rigid structure and at no time comes into contact with the face 16 of the pulley 15 as is shown in FIG. 5. In accordance with the embodiment shown in FIG. 6, the segment 21 is replaced with a springy member 35, suitably a resilient plastic, the springiness normally holding the member out of contact with the face 16 of the pulley. However, since the member 35 is engaged by the belt as soon as arm 19 is released, member 35 will be drawn down into contact with the pulley face 16 and will maintain contact during the one or more revolutions through which the clutch operates. After shaft 13 stops, the segment 35 will again flex back out of contact with the pulley face 16. The member 35 may be provided with a friction surface to ensure that there will be no slippage between the pulley face 15 and the member 35. In this embodiment of the invention, advantage is taken of the inertia of pulley 15 as well as that of pulley 11 and belt 17 so that the maximum amount of energy can be taken from shaft 13 for a motor of given size.

In FIG. 7, another embodiment of the invention is shown wherein a flexible belt having teeth thereon is employed. Belt 40 has teeth 42 formed integrally therewith and the drive pulley 44 as well as the idler pulley 46 have complimentary teeth. The segment 48 has complimentary teeth 49 and is attached to shaft 50 as previously described. The parts not numbered in this drawing have exactly the same function as the parts of FIG. 1. As can be seen from FIG. 8, when the solenoid is pulsed, the segment 48 engages the teeth 42 as previously described and causes shaft 50 to revolve.

In some applications, it is desirable to take two intermittent motions from a single motor. For instance, in a terminal printer, it would be highly desirable to derive the character feed and line feed motions from the same motor. Thus, referring to FIGS. 9 and 10, there is shown a motor 52 driving shaft 54 which is keyed to pulley 56. A second shaft 58 is free to revolve with respect to shaft 54 and is concentric therewith. Shaft 58 is supported near its outer end by bearing 59. Shaft 58 carries arm 60 to which segment 62 is attached. Shaft 58 is normally prevented from rotation by means of detent 64 while spring 66 biases arm 60 in the direction of rotation and against the detent 64. The driven pulley 68 is mounted on shaft 70 but is free to rotate with respect thereto. Belt 67 drives pulley 68 from pulley 56. Arm 72, carrying segment 74, is fixed to shaft 70 while detent 76 normally prevents shaft 70 from rotating and spring 78 biases arm 72 in the direction of rotation. If it is desired that shaft 70 turn, detent 76 is pulsed and the operation is exactly as was described in connection with FIG. 1. When it is desired that shaft 58 rotate, detent 64 is pulsed, whereupon the segement 62 is urged into contact with the belt 67 causing shaft 58 to rotate. Since the intervention of the segment 62 between the belt and the pulley tends to reduce the ability of the pulley to drive the belt, preferably the segment 62 does not overlie the entire face width of the pulley but only about half of it. Thus, as can be seen at the bottom portion of FIG. 10, during the driving cycle the belt is driving both segment 62 and pulley 56. Of course, if the segment 62 is made shorter, so that it extends only a few degrees over the face of pulley 56, there will be less tendency for the pulley to be free from the belt, in which case this overlapping relationship of the belt over both the pulley and segment becomes less necessary.

Still another embodiment of the invention is shown in FIG. 11 wherein shaft 80 is keyed to a pulley 82. The pulley is provided with a notch 84 and a belt 86 lies in this notch with a portion of the belt 88 being unsupported by the pulley and held in an extended position by the combination of the stiffness of the belt material and the notch 84. An arcuate segment member 90 lies substantially on the same plane as that of the notch 88. Segment 90 is supported on arm 92 which corresponds with the arm 60 of FIG. 9. Now, when the shaft is released, the belt couples the pulley to the segment. In this embodiment of the invention, the belt is not distorted, as is in the previous embodiments but merely serves as a coupling element between the segment and the pulley face which lie on the same plane. Further, with this embodiment of the invention the drive pulley is fully in contact with the belt at all times and the segment does not tend to decouple the drive pulley from the belt.

Of course, if one wishes to take two independent drives from a single motor it is not necesssary to employ the structure of FIG. 9 and a single motor can drive two or more integral clutches of the type shown in FIG. 1 by providing the drive motor with a plurality of drive pulleys.

Although certain specific embodiments of the present invention have been illustrated, it will be obvious to those skilled in the art that many variations can be made without departing from the spirit of this invention.

I claim:

1. An integral revolution clutch comprising:
   a continuously rotatable drive pulley;
   a driven shaft;
   a secondary pulley mounted for free rotation about the axis of the driven shaft;
   belt means engaging both said drive pulley and said secondary pulley to rotate said secondary pulley continuously said belt means engaging only a portion of the driving face of said secondary pulley;
   a segment member aligned with a portion of the driving face of said secondary pulley, said member having an arcuate length of less than 180°, said segment member being fixed to said driven shaft and normally lying over only that portion of the driving face of said secondary pulley not engaged by said belt means;
   stop means normally preventing rotation of said driven shaft;
   bias means urging said driven shaft against said stop means, in the direction of rotation of the secondary pulley;
   stop release means for releasing said stop means whereby said bias means urge said segment member into engagement with said belt, causing said belt to rotate said segment and said driven shaft;
   and stop restoration means for restoring said stop means to interrupt rotation of said segment member and said driven shaft after an integral number of revolutions.

2. The structure of claim 1 wherein the bias means comprises a spring.

3. The structure of claim 1 wherein said segment member is flexible and wherein said belt means causes said segment member to flex and contact the driving face of said secondary pulley when said segment member is in engagement with said belt means.

4. The structure of claim 1 wherein said belt means is wider than said segment, whereby said belt can contact said segment and a pulley simultaneously.

5. The structure of claim 1 wherein said pulleys and said belt means consist of toothed members.

6. The structure of claim 1 having the following additional members in combination therewith:
   a. a second shaft concentric with said drive pulley,
   b. said second shaft being free to rotate with respect to said drive pulley,
   c. said second shaft having second segment means overlying a portion of said drive pulley,
   d. stop means normally preventing rotation of said second shaft,
   e. bias means for urging said second shaft against said stop means, and
   f. means for momentarily releasing said stop means whereby said bias means will urge said second segment into engagement with said belt, causing said belt to rotate said segment and said second shaft.

* * * * *